United States Patent Office 3,586,663
Patented June 22, 1971

3,586,663
ETHOXY ETHYL AMINO PHENYL AZO DYESTUFF
Winfried Kruckenberg, Leverkusen, Germany, assignor to Farbenfabriken Bayer Aktiengesellschaft, Leverkusen, Germany
No Drawing. Filed Apr. 12, 1967, Ser. No. 630,214
Claims priority, application Germany, Apr. 19, 1966,
F 48,968; Oct. 7, 1966, F 50,378
Int. Cl. C07c *107/04, 107/06;* C09b *29/04*
U.S. Cl. 260—207.1
8 Claims

ABSTRACT OF THE DISCLOSURE

Water insoluble azo dyestuffs free from sulphonic acid and carboxylic acid groups of the formula

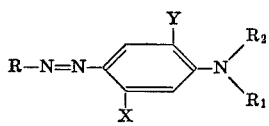

in which R is a radical of the benzene or heterocyclic series; X is acylamino; Y is hydrogen, halogen, alkyl or alkoxy; $R_1$ is

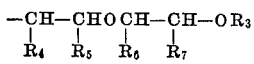

$R_4$, $R_5$, $R_6$ and $R_7$ are hydrogens or lower alkyl radicals with 1 to 2 carbons; $R_3$ is hydrogen or —$COR_8$; $R_8$ is an optionally substituted lower alkyl radical; $R_2$ is $C_nH_{2n+1}$; and $n$ is an integer from 1 to 4. The dyestuffs are useful for dyeing hydrophobic fibers, e.g. aromatic polyesters.

---

The object of the invention comprises water-insoluble azo dyestuffs of the formula

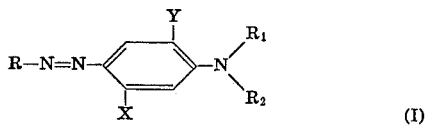 (I)

These valuable new dyestuffs are obtained by coupling a diazo component of the benzene or heterocyclic series with an amine of the general formula

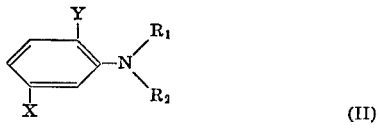 (II)

in the p-position to the group

selecting starting components which are free from sulphonic acid and carboxylic acid groups.

In the general formulae, R denotes a radical of the benzene or heterocyclic series, X is an acylamino substituent, Y stands for hydrogen, halogen, an alkyl or alkoxy group, $R_2$ denotes a radical —$C_nH_{2n+1}$, wherein $n$ stands for an integer from 1 to 4, $R_1$ denotes a group

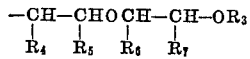

in which $R_4$, $R_5$, $R_6$ and $R_7$ are hydrogen or lower alkyl radicals with 1 to 2 carbon atoms and $R_3$ is hydrogen or the radical —$COR_8$, wherein $R_8$ stands for a lower alkyl radical.

The lower alkyl radical $R_8$ may be further substituted and may be present, for example, in the form of haloalkyl radicals, such as chloroethyl-; cyanoalkyl radicals, such as cyanoethyl-; or carboalkoxyalkyl radicals, such as carbomethoxy- (or -ethoxy-) ethyl radicals.

Coupling of the starting components is carried out in the usual manner, preferably in an acidic solution or suspension. Besides other diazo components of the benzene series, aniline derivatives which contain one or more cyano groups prove to be particularly advantageous. Suitable diazo components are, inter alia:

4-cyanoaniline,
4-nitroaniline,
4-nitro-2-chloroaniline,
4-nitro-2-cyanoaniline,
2,4-dicyanoaniline,
2,4-dinitroaniline,
3-chloro-4-cyanoaniline,
2-cyano-5-chloroaniline,
3,4-dicyanoaniline,
2,5-dicyanoaniline,
2,6-dichloro-4-nitroaniline,
2-chloro-4-cyanoaniline,
4-amino-acetophenone,
2-amino-5-nitrotoluene,
2-amino-5-nitroanisole,
3-nitro-4-aminotoluene,
2,4-dichloroaniline,
2,5-dichloro-4-nitroaniline,
2-trifluoromethyl-4-chloroaniline,
3-chloro-4-amino-1-trifluoromethyl-benzene,
2-cyano-4,5,6-trichloroaniline,
2,4-dinitro-6-bromo-aniline,
2-cyano-4,6-dinitroaniline,
2-cyano-6-bromo- or -6-chloro-4-nitroaniline,
2,4-dicyano-6-chloroaniline,
2-methoxy-4-nitroaniline,
2-amino-5-nitro-benzoic acid methyl ester,
4-aminobenzoic acid alkylamides, such as
-methyl-
or
-dimethyl-amide,
4-amino-benzoic acid methyl ester,
3-nitro-4-aminobenzoic acid butyl ester,
1-aminobenzene-3-
or
-4-methylsulphone
or
-ethylsulphone.

The following diazo components of the heterocyclic series prove to be particularly valuable:
2-amino-5-nitrothiazole,
2-amino-4-phenyl-thiadiazole-1,3,5,
2-amino-5-aceto-3-nitrothiophen,
2-amino-benzothiazole,
aminotriazole,
2-amino-5-nitrothiadiazole-1,3,4
or
6-methoxy-2-aminobenzothiazole.

The following amines can be used as coupling components, for example:

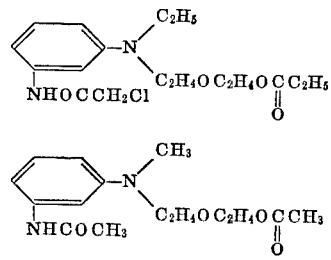

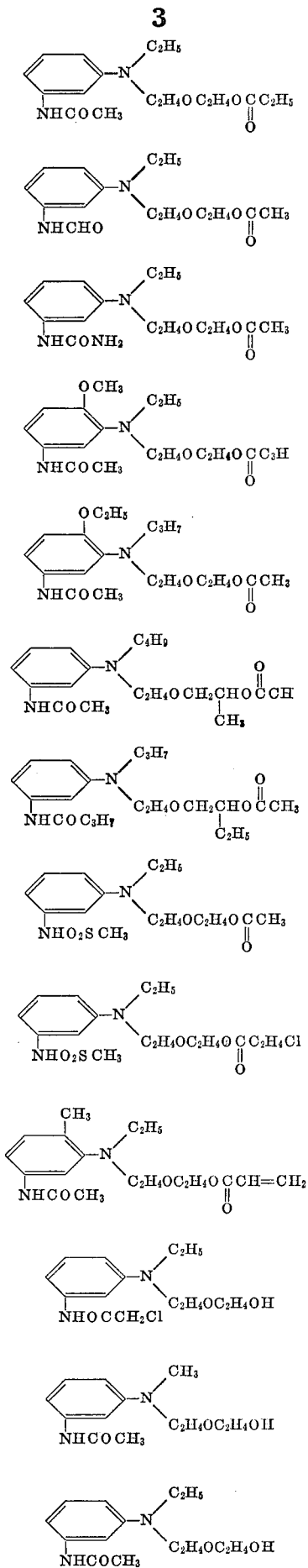
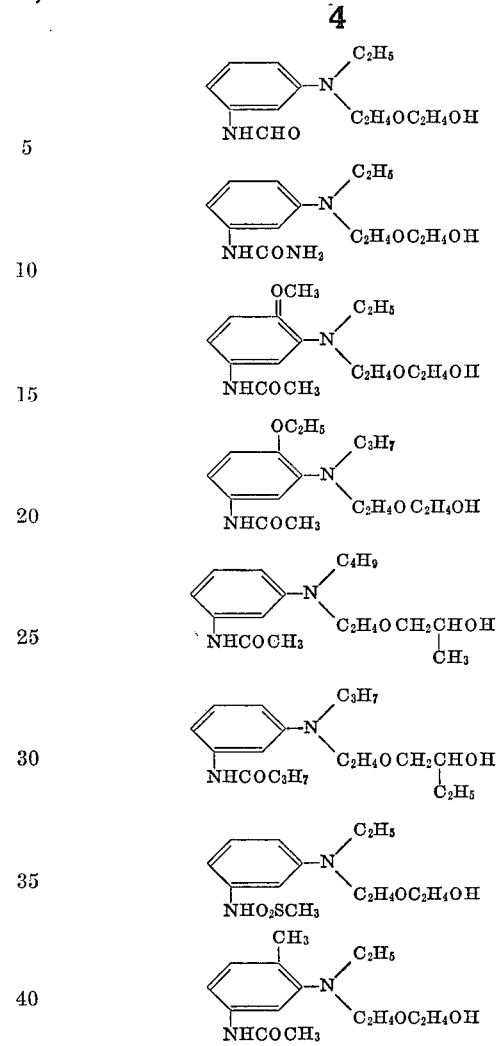

The above process for the production of the new azo dyestuffs can also be modified in that the formation of the terminal acyloxy group —OOCR₈ is carried out only at the final stage of the process, i.e. after coupling the diazo compound and the aniline coupling component containing, in this case, a hydroxy alkoxyalkyl group, or that an acylamino group X is converted at the final stage of the process into an acylamino group of different type by selective hydrolysis and re-acylation.

The dyestuffs which can be obtained according to the present process are eminently suitable for the dyeing and printing of hydrophobic materials, especially of textiles or fibers made of aromatic polyesters, for example, polyethylene terephthalates or condensation products obtained from terephthalic acid and 1,4-bis-(hydroxymethyl)-cyclohexane. Dyeings and prints of very good fastness properties are obtained on these materials, especially of very good fastness to light, washing adn thermofixing. The dyestuffs are characterised by a good affinity to the fiber.

The dyestuffs are also suitable for the dyeing and printing of cellulose acetate and triacetyl cellulose and of fiber material of synthetic superpolyamide and polyacrylonitrile.

EXAMPLE 1

16.3 parts by weight 2-cyano-4-nitroaniline are dissolved at 0–15° C. in 400 parts by weight of concentrated sulphuric acid, the solution is diazotised, with good cooling and stirring, with 170 parts by volume nitrosyl-sulphuric acid (42 g. nitrite in 100 ml. $H_2SO_4$) and the mixture is poured on to about 3000 parts by weight of ice after about 3 hours. A slight excess of nitrite is removed by means of amidosulphonic acid and the solution is filtered. This solution is then combined with a solution of 29.7 parts by weight of an amino compound of the formula

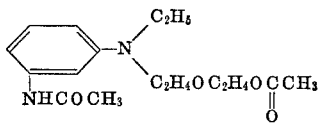

the mixture is partially neutralised with a dilute sodium hydroxide solution and the coupling is completed with sodium acetate. The dyestuff is filtered and washed. In the dry state it is a dark powder which dissolves in organic solvents, such as acetone or alcohol, with a blue colour. When brought into a fine dispersion by means of suitable additives, the dyestuff dyes fabrics of acetate rayon in clear violet shades of good fastness to washing and light.

The following dyestuffs can be obtained in the same way from the corresponding starting components; they dye fabrics of aromatic polyesters, such as polyethylene terephthalates, in the specified shades:

| | Shade |
|---|---|
| $O_2N\!-\!\underset{CN}{\overset{Cl}{C_6H_2}}\!-\!N\!=\!N\!-\!\underset{NHCOCH_3}{C_6H_3}\!-\!N(C_2H_5)(C_2H_4OC_2H_4OCOCH_3)$ | Blue; |
| $\underset{CN}{\overset{Cl}{C_6H_3}}\!-\!N\!=\!N\!-\!\underset{NHCOCH_3}{C_6H_3}\!-\!N(C_2H_5)(C_2H_4OC_2H_4OCOC_2H_5)$ | Red. |
| $O_2N\!-\!\underset{NO_2}{\overset{Br}{C_6H_2}}\!-\!N\!=\!N\!-\!\underset{NHCOCH_3}{C_6H_3}\!-\!N(C_2H_5)(C_2H_4OC_2H_4OCOCH_3)$ | Blue. |
| $O_2N\!-\!\underset{CN}{\overset{Cl}{C_6H_2}}\!-\!N\!=\!N\!-\!\underset{NHCONH_2}{\overset{OCH_3}{C_6H_2}}\!-\!N(C_2H_5)(C_2H_4OC_2H_4OCOCH_3)$ | Do. |
| $O_2N\!-\!\underset{Cl}{C_6H_3}\!-\!N\!=\!N\!-\!\underset{NHCOCH_2OCH_3}{C_6H_3}\!-\!N(C_2H_5)(C_2H_4OC_2H_4OCOC_2H_3)$ | Violet; |
| $NC\!-\!\underset{CN}{C_6H_3}\!-\!N\!=\!N\!-\!\underset{NHCOCH_3}{C_6H_3}\!-\!N(C_3H_7)(C_2H_4OC_2H_4OCOC_2H_5)$ | Orange. |
| $NH\!-\!\underset{CN}{C_6H_3}\!-\!N\!=\!N\!-\!\underset{NHCOCH_3}{C_6H_3}\!-\!N(C_2H_5)(C_2H_4OC_2H_4OCOCH_2Cl)$ | Red; |
| $NC\!-\!\underset{CN}{\overset{Cl}{C_6H_2}}\!-\!N\!=\!N\!-\!\underset{NHCOCH_3}{C_6H_3}\!-\!N(C_2H_5)(C_2H_4OC_2H_4OCOCH_2CN)$ | Red. |
| $O_2N\!-\!\underset{Cl}{C_6H_3}\!-\!N\!=\!N\!-\!\underset{NHCOCH_3}{C_6H_3}\!-\!N(C_2H_5)(C_2H_4OCH_2CH(CH_3)OCOCH_3)$ | Violet. |
| $O_2N\!-\!C_6H_4\!-\!N\!=\!N\!-\!\underset{NHCOCH_3}{C_6H_3}\!-\!N(C_2H_5)(CH(CH_3)CH_2OCH_2CH(CH_3)OCOCH_3)$ | Red. |
| $O_2N\!-\!\underset{CN}{\overset{Br}{C_6H_2}}\!-\!N\!=\!N\!-\!\underset{NHCOCH_3}{\overset{OC_2H_5}{C_6H_2}}\!-\!N(C_2H_5)(C_2H_4OC_2H_4OCOCH_3)$ | Blue. |

| Structure | Shade |
|---|---|
| CH₃SO₂—C₆H₄—N=N—C₆H₃(NHCHO)—N(C₂H₅)(C₂H₄OC₂H₄OCOCH₃) | Red. |
| NC—C₆H₂(Cl)(Cl)—N=N—C₆H₃(NHCOCH₃)—N(C₂H₅)(C₂H₄OC₂H₄OCOCH₃) | Red. |
| CH₃COC(=CH)—C(NO₂)=C(S)—N=N—C₆H₃(NHCOCH₃)—N(C₂H₅)(C₂H₄OC₂H₄OCOCH₃) | Blue-green. |
| O₂N—C(=N—CH=)—C(S)—N=N—C₆H₃(NHCOCH₃)—N(C₂H₅)(C₂H₄OC₂H₄OCOCH₃) | Blue-green |
| C₆H₅—C(=N—)—C(S)—N=N—C₆H₃(NHCOCH₃)—N(C₂H₅)(C₂H₄OC₂H₄OCOCH₃) | Red. |
| CH₃—C₆H₂(CN)(CN)—N=N—C₆H₃(NHCOCH₃)—N(C₂H₅)(C₂H₄OC₂H₄OCOCH₃) | Red. |
| O₂N—C₆H₂(Cl)(Cl)—N=N—C₆H₃(OCH₃)(NHCOCH₃)—N(C₂H₅)(C₂H₄OC₂H₄OCOCH₃) | Blue-violet. |
| NC—C₆H₃(Cl)—N=N—C₆H₃(NHCOCH₃)—N(C₂H₅)(C₂H₄OC₂H₄CH(CH₃)OCOCH₃) | Red. |
| O₂N—C₆H₃(CH₃)—N=N—C₆H₃(NHCOCH₃)—N(C₂H₅)(C₂H₄OC₂H₄OCOC₂H₅) | Red. |

The base of the formula

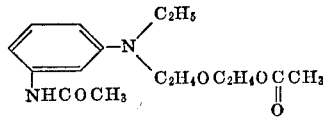

used in some dyestuffs of the above examples as coupling component can be obtained in the following manner:

1.2 moles β-chloro-β′-acetoxy diethyl ether and 1.2 moles of anhydrous sodium acetate are added to 1 mole 1-N-ethyl-amino-3-acetyl-aminobenzene at 120–140° C. in the course of 6 to 8 hours in such a manner that the amount of sodium acetate always remains somewhat deficient. The completion of the reaction is established by chromatography. The base so obtained can be separated from the other reaction products by means of water and a mixture of methanol and water or it can be converted into the dyestuff without further purification.

Other aromatic amines containing the group

—NC₂H₄OC₂H₄OCR₃
 |           ‖
 R₁          O can be obtained in the same manner. Dyeing is performed as follows:

250 grams of polyethylene terephthalate fibers are introduced at 50° C. into a bath of 8 litres containing 4 g. of an emulsifying polyglycol ether, 4 g. of the well dispersed dyestuff 16 g. of a carrier, for example, benzoic acid and 20 g. diammonium phosphate. The bath is brought to the boil within 30 minutes and dyeing is continued at the same temperature for 1½ to 2 hours. The dyeing is subsequently washed alkaline at 70° C. for 20 minutes, rinsed and dried. A clear dyeing is obtained, which is fast to light and washing and is distinguished by a good fastness to thermofixing.

EXAMPLE 2

16.3 parts by weight 2-cyano-4-nitroaniline are dissolved at 0–15° C. in 400 parts by weight of concentrated sulphuric acid, the solution is diazotised, with good stirring and cooling, with 170 parts by volume nitrosyl sulphuric acid (42 g. nitrite in 100 ml. H₂SO₄) and the mixture is poured on to about 3000 parts by weight of ice after about 3 hours. A slight excess of nitrite is removed by means of amidosulphonic acid and the solution is filtered. This solution is then combined with a solution of 25.5 parts by weight of an amino compound of the formula

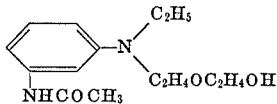

the mixture is partially neutralised with a dilute sodium hydroxide solution and the coupling completed with sodium acetate. The dyestuff is filtered and washed. In the dry state, it is a black powder which dissolves in organic solvents, such as acetone or alcohol, with a blue colour. When brought into a fine dispersion by means of suitable additives, the dyestuff dyes fabrics of acetate rayon in clear violet shades of good fastness to washing and light.

The following dyestuffs can be obtained in the same way from the corresponding starting components; they dye fabrics of aromatic polyesters, such as polyethylene terephthalates, in the specified shades:

| Structure | Shade |
|---|---|
| $O_2N-\bigcirc(Cl)(CN)-N=N-\bigcirc(NHCOCH_3)-N(C_2H_5)(C_2H_4OC_2H_4OH)$ | Blue. |
| $\bigcirc(Cl)(CN)-N=N-\bigcirc(NHCOCH_3)-N(C_2H_5)(C_2H_4OC_2H_4OH)$ | Red. |
| $O_2N-\bigcirc(Br)(NO_2)-N=N-\bigcirc(NHCOCH_3)-N(C_2H_5)(C_2H_4OC_2H_4OH)$ | Blue. |
| $O_2N-\bigcirc(Cl)(CN)-N=N-\bigcirc(OCH_3)(NHCONH_2)-N(C_2H_5)(C_2H_4OC_2H_4OH)$ | Do. |
| $O_2N-\bigcirc(Cl)-N=N-\bigcirc(NHCOCH_2OCH_3)-N(C_2H_5)(C_2H_4OC_2H_4OH)$ | Violet. |
| $NC-\bigcirc(CN)-N=N-\bigcirc(NHCOCH_3)-N(C_3H_7)(C_2H_4OC_2H_4OH)$ | Orange. |
| $NC-\bigcirc(CN)-N=N-\bigcirc(NHCOCH_3)-N(C_2H_5)(C_2H_4OC_2H_4OH)$ | Red. |
| $NC-\bigcirc(Cl)(CN)-N=N-\bigcirc(NHCOCH_3)-N(C_2H_5)(C_2H_4OC_2H_4OH)$ | Red. |
| $O_2N-\bigcirc(Cl)-N=N-\bigcirc(NHCOCH_3)-N(C_2H_5)(C_2H_4OCH_2CHOHCH_3)$ | Violet. |
| $O_2N-\bigcirc-N=N-\bigcirc(NHCOCH_3)-N(C_2H_5)(CHCH_3CH_2OCH_2CHOHCH_3)$ | Red. |
| $O_2N-\bigcirc(Br)(CN)-N=N-\bigcirc(OC_2H_5)(NHCOCH_3)-N(C_2H_5)(C_2H_4OC_2H_4OH)$ | Blue. |

| | Shade |
|---|---|
| 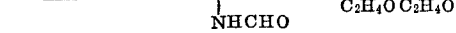 | Red. |
|  | Red. |
| 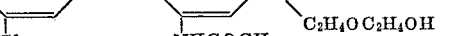 | Blue-green. |
| 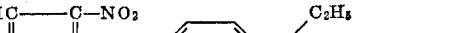 | Do. |
| 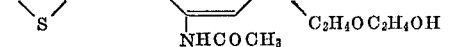 | Red. |
| 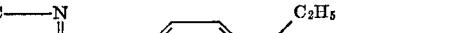 | Red. |
| 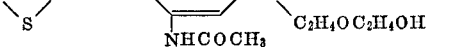 | Blue-violet. |
|  | Red. |
| 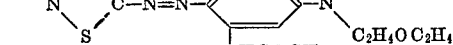 | Red. |

Dyeing is performed as follows:

250 grams of polyethylene terephthalate fibers are introduced at 50° C. into a dyebath of 8 litres containing 4 g. of an emulsifying polyglycol ether, 4 g. of the well dispersed dyestuff, 16 g. of a carrier, for example, benzoic acid, and 20 g. diammonium phosphate. The bath is brought to the boil within 30 minutes and dyeing is continued at the same temperature for 1½ to 2 hours. The dyeing is subsequently washed alkaline at 70° C. for 20 minutes, rinsed and dried. A clear dyeing is obtained, which is fast to light and washing and is distinguished by a good fastness to thermofixing.

I claim:

1. Azo dyestuffs free from sulfonic acid and carboxylic acid groups of the formula

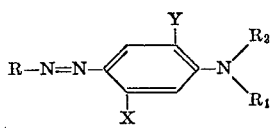

in which R is phenyl substituted with cyano, nitro, chloro, bromo, acetyl, lower alkyl, lower alkoxy, trifluoromethyl, carbomethoxy, methylamido, dimethylamido, carbobutoxy or lower alkyl sulfone, or a radical selected from the group consisting of nitro-thiazole, phenyl-thiadiazole, acetonitrothiophen, benzo-thiazole, methoxybenzothiazole, triazole and nitro-thiadiazole; X is an acylamino substituent selected from the group consisting of formylamino, amino-carbonylamino, lower alkyl carbonylamino, lower alkyl sulfonylamino and lower alkyl carbonylamino substituted with chlorine; Y is hydrogen, lower alkyl or lower alkoxy; $R_1$ is

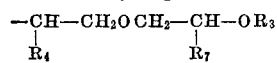

$R_4$ and $R_7$ are hydrogen or lower alkyl having 1 to 2 carbon atoms; $R_3$ is hydrogen or —$COR_8$; $R_8$ is a substituted or unsubstituted lower alkyl radical said substituents being chloro, cyano, carbomethoxy or carboethoxy; $R_2$ is $C_nH_{2n+1}$; and $n$ is an integer from 1 to 4.

2. Azo dyestuffs free from sulphonic acid and carboxylic acid groups of the formula

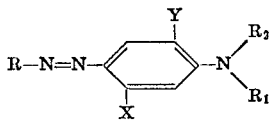

in which R is an unsubstituted or a substituted mono- or dicyano-aniline said substituents selected from the group consisting of chloro, bromo, lower alkyl, lower alkoxy, nitro and lower alkyl sulphone; X is lower alkyl carbonylamino or lower alkyl sulphonylamino; Y is hydrogen, lower alkyl or lower alkoxy; $R_2$ is methyl, ethyl or propyl; and $R_1$ is a group —$CH_2CH_2OCH_2CH_2OR_3$, wherein $R_3$ is selected from the group consisting of hydrogen and —$COR_8$ wherein $R_8$ is an unsubstituted or a substituted lower alkyl radical said substituents being chloro, cyano, carbomethoxy or carboethoxy.

3. The azo dyestuff of claim 1 of the formula

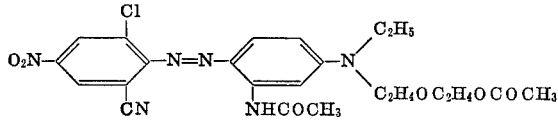

4. The azo dyestuff of claim 1 of the formula

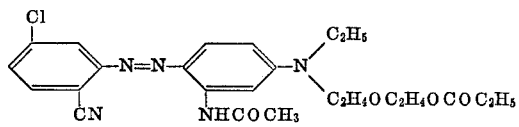

5. The azo dyestuff of claim 1 of the formula

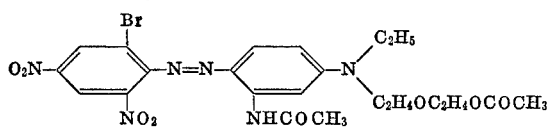

6. The azo dyestuff of claim 1 of the formula

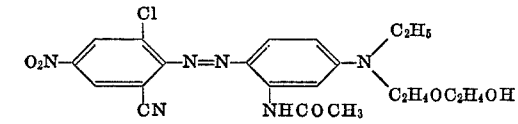

7. The azo dyestuff of claim 1 of the formula

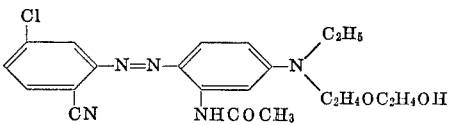

8. The azo dyestuff of claim 1 of the formula

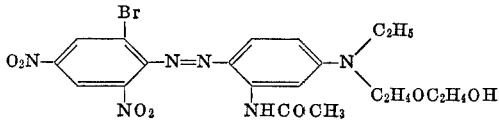

References Cited

UNITED STATES PATENTS

| | | | |
|---|---|---|---|
| 2,118,088 | 5/1938 | Knight et al. | 260—207X |
| 2,757,173 | 7/1956 | Dickey et al. | 260—207.5 |
| 3,122,410 | 2/1964 | Mueller et al. | 260—207.5X |
| 3,177,198 | 4/1965 | Weis et al. | 260—207X |

FOREIGN PATENTS

| | | | |
|---|---|---|---|
| 3,335,125 | 8/1967 | Illy | 260—158 |
| 345,705 | 5/1960 | Switzerland | 260—207.5 |
| 933,160 | 8/1963 | Great Britain | 260—158 |
| 427,081 | 6/1967 | Switzerland | 260—158 |

CHARLES B. PARKER, Primary Examiner

C. F. WARREN, Assistant Examiner

U.S. Cl. X.R.

260—152, 157, 158, 205, 206, 207, 207.5; 8—41, 50